(12) United States Patent
Budde et al.

(10) Patent No.: US 7,019,946 B2
(45) Date of Patent: Mar. 28, 2006

(54) LAMINATE LOAD BEAM WITH TRENCH ARRANGEMENT HAVING CIRCUIT HOUSED THEREIN

(75) Inventors: Richard August Budde, Plymouth, MN (US); Keefe Michael Russell, Robbinsdale, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 202 days.

(21) Appl. No.: 10/607,685

(22) Filed: Jun. 27, 2003

(65) Prior Publication Data

US 2004/0047078 A1   Mar. 11, 2004

Related U.S. Application Data

(60) Provisional application No. 60/409,889, filed on Sep. 11, 2002.

(51) Int. Cl.
G11B 5/48 (2006.01)
G11B 21/16 (2006.01)

(52) U.S. Cl. ............................ 360/244.3; 360/245.9
(58) Field of Classification Search ............ 360/244.3, 360/245.8, 245.9
See application file for complete search history.

(56) References Cited

U.S. PATENT DOCUMENTS

| | | | |
|---|---|---|---|
| 4,670,804 A * | 6/1987 | Kant et al. | 360/245.8 |
| 4,819,094 A * | 4/1989 | Oberg | 360/245.9 |
| 5,134,530 A | 7/1992 | Hall | |
| 5,187,625 A * | 2/1993 | Blaeser et al. | 360/244.3 |
| 5,541,791 A | 7/1996 | Yamasaki et al. | |
| 5,612,840 A * | 3/1997 | Hiraoka et al. | 360/245.9 |
| 5,680,274 A * | 10/1997 | Palmer | 360/245.9 |
| 5,696,651 A * | 12/1997 | Endo et al. | 360/245.8 |
| 5,731,931 A * | 3/1998 | Goss | 360/244.9 |
| 5,801,905 A | 9/1998 | Schirle et al. | |
| 5,883,759 A | 3/1999 | Schulz | |
| 5,898,545 A | 4/1999 | Schirle | |
| 6,018,439 A | 1/2000 | Forbord et al. | |
| 6,288,877 B1 * | 9/2001 | Khan et al. | 360/245.9 |
| 6,785,094 B1 * | 8/2004 | Arya et al. | 360/244.3 |

* cited by examiner

Primary Examiner—Craig A. Renner (57) ABSTRACT

A disc drive has an improved electrical interconnect assembly mated to a suspension assembly for coupling one or more conductive paths leading from a read/write head to control circuitry located off the suspension assembly. The interconnect assembly has a portion that extends along an edge of the suspension assembly that is oriented towards the outer diameter of a disc on the disc drive. The suspension may be made of a laminate material and may include a trench formed in the suspension that is configured to mount a portion of the interconnect assembly. Positioning a portion of the interconnect assembly on the edge of the suspension towards the disc outer diameter and mounting another portion of the interconnect assembly in a trench formed in the suspension assembly reduces windage-induced vibrations of the suspension assembly and, consequently, the head.

22 Claims, 6 Drawing Sheets

LAMINATE LOAD BEAM WITH TRENCH ARRANGEMENT HAVING CIRCUIT HOUSED THEREIN

RELATED APPLICATIONS

This application claims priority of U.S. provisional application Ser. No. 60/409,889, filed Sep. 11, 2002, entitled "Interconnect Routing For A Head Gimbal Assembly".

FIELD OF THE INVENTION

The present invention relates to suspension assemblies for supporting a head in disc drives, and more particularly to an apparatus to reduce windage-induced vibration of the head by routing an interconnect assembly along a leading edge of the suspension assembly.

BACKGROUND OF THE INVENTION

In a disc drive system, air currents are induced when one or more discs are rotating at high speeds. Air currents, or windage, cause undesirable effects, such as vibration in system components. Such vibration is undesirable because it can introduce errors in the performance of the disc drive. One component that is adversely affected by this windage-induced vibration is the suspension assembly. The suspension assembly is used to support/suspend a read/write head, and is mated with an interconnect assembly, which is used to electrically connect the read/write head to disc drive electronics that are positioned away from the read/write head and off the suspension assembly.

One type of interconnect assembly is a flex-on suspension, or flex circuit. Flex circuit interconnect assembly includes a separately fabricated printed circuit that is typically mounted to the suspension assembly using an adhesive after assembly of the other suspension components. The flex circuit is relatively less expensive and easier to manufacture than the other types of interconnect assemblies.

Other types of suspension interconnect assemblies include twisted wires, trace suspension assemblies, and circuit integrated suspension assemblies. Twisted wire assemblies include a bundle of wires that are glued to the suspension assembly. A trace suspension assembly includes a unitary steel gimbal with electrical traces welded to the suspension assembly. A circuit integrated suspension assembly deposits traces directly onto the suspension assembly by a sputtering or like deposition process.

In general, the flex circuit is mated to a finished suspension assembly. The flex circuit is compliant along its entire length. The head and center portions of the flex circuit are typically attached to the suspension. However, the tail portion of the flex circuit is generally not attached to the suspension and hangs freely or is attached with tabs extending outward from a side of the suspension along a length of the base plate of the suspension. Thus, the tail portion is typically susceptible to windage forces present in the disc drive assembly that then translates to undesirable vibrations in the suspension assembly.

As the data density on the disc is continually increasing, it becomes more critical to eliminate or reduce factors that introduce error into the head reading and writing data. Since vibration of the suspension assembly is one factor that affects the operation of the head, a need exists for reducing windage-induced vibration of the head caused by the suspension assembly.

SUMMARY OF THE INVENTION

Against this backdrop the present invention has been developed. In one example embodiment, the invention is directed to an apparatus for reducing windage-induced vibration in a disc drive having a rotating disc, wherein the disc has an inner and an outer diameter. The load beam includes a trench arrangement and flexible circuitry is housed within the trench. The apparatus may also include a plate that cooperates with the load beam to hold the flexible circuitry in the trench.

Another example embodiment is directed to a suspension assembly configured to reduce windage-induced vibration in a head supported by the suspension assembly. The system includes a base plate and a load beam mounted to the base plate. The load beam may have length and may include a laminate material. The laminate material of the load beam may include a bottom layer, a top layer, and a core layer positioned between the top and bottom layers. The load beam may further include a trench formed in the laminate material that extends along at least a portion of the length of the load beam. The assembly may also include an interconnect circuit mounted to the load beam in at least a portion of the trench.

Another aspect of the invention relates to a method of forming a suspension assembly that is resistant to windage-induced vibrations. The suspension assembly may include a load beam constructed of a laminate material and having a length, an interconnect circuit, and a base plate. Steps of the method may include etching layers of the laminate material and assembling the etched layers into a composite material. The assembled layers may define a trench that extends along a portion of the load beam length. Further steps may include securing a first portion of the interconnect circuit in the trench, and mounting the load beam to the base plate so that the first portion of the interconnect in the trench is positioned between the load beam and the base plate.

These and various other features as well as advantages which characterize the present invention will be apparent from a reading of the following detailed description and a review of the associated drawings.

DETAILED DESCRIPTION

In the following description of preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

In general, the present disclosure discusses an apparatus that reduces windage-induced vibrations is a disc drive as seen at the heads that pass over the disc and read and write data to and from the disc. The apparatus includes a load beam including a leading section and a swage hole. The load beam also includes a trench arrangement. Flexible circuitry is housed within the trench. The apparatus also includes a plate that cooperates with the load beam to hold the flexible circuitry in the trench.

Disc Drive System

Figure 1:
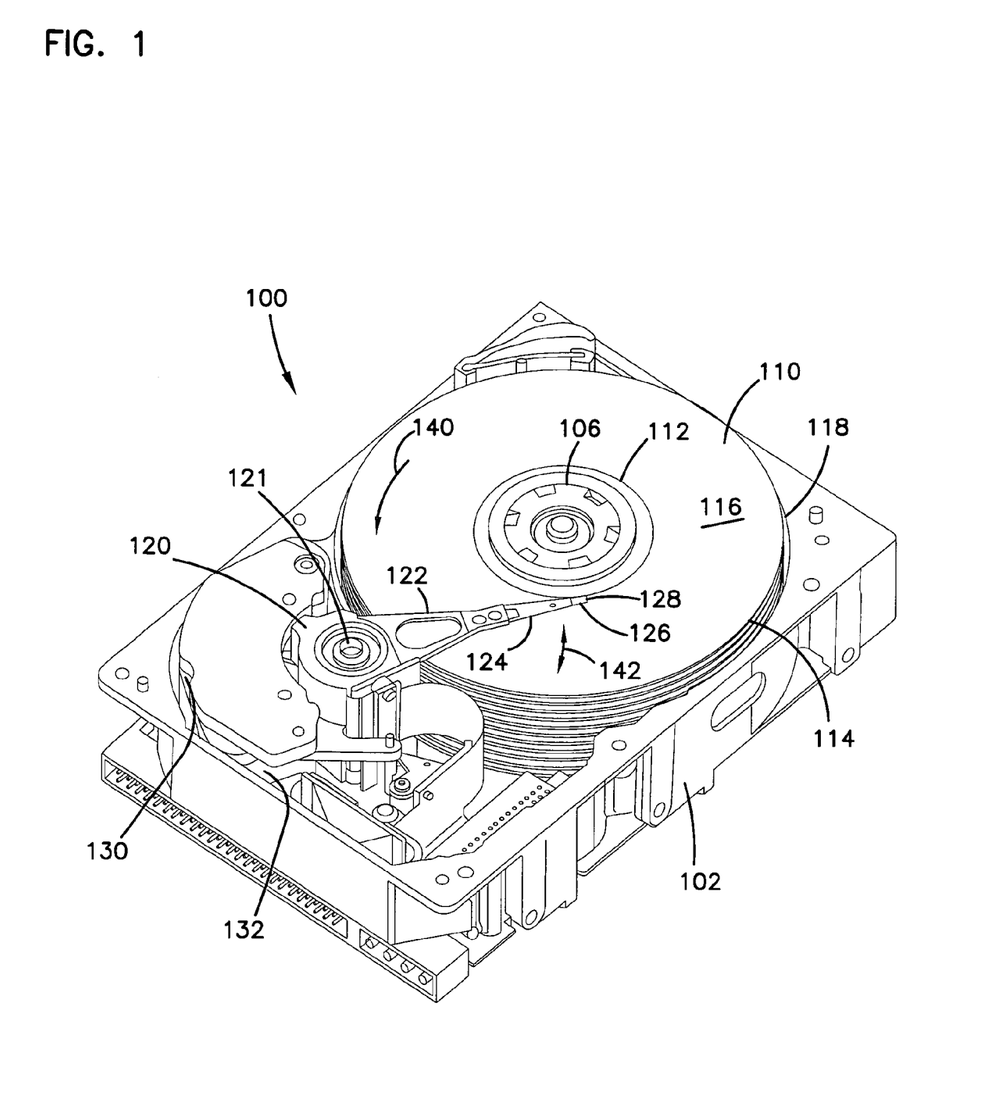
FIG. 1 is a top perspective view of a disc drive in a cover of the disc drive has been removed to show various features of the disc drive in which embodiments of the present invention may be practiced.

FIG. 1 is an asymmetric view of a disc drive 100 having structure in which principles of the present invention may be practiced. The disc drive 100 includes a base 102, and a cover (not shown). Base 102 and the cover form a disc drive enclosure. Extending into base 102 is a spindle motor 106 to which several discs 110 are secured. Each disc 110 is generally angular in shape, with an inner edge 112 and an outer edge 114 circumscribing opposing disc surfaces 116 (of which only one is visible in the drawing) to which data can be stored for later retrieval. Base 102 provides a cavity or room for disc 110 to be seated in a substantially coaxial arrangement, with an inner wall 118 of the base running around outer edges 114 of disc 110, substantially transverse to disc surfaces 116.

On one side of a pivot 121, an actuator assembly 120 includes a plurality of arms 122 to which are attached load beams or suspension assemblies 124. At the end of each suspension assemblies 124 is a slider or head 126 that carries the read/write devices (designated generally by 128). The present invention is equally applicable to sliders having different types of read/write devices, such as what is generally referred to as transducers, magneto resistive heads, giant magneto resistive heads, or tunneling magneto resistive heads. On another side of the pivot, actuator assembly 120 extends to support a voice coil 130 next to one or more magnets 132 fixed relative to base 102. When energized, resultant electromagnetic forces on voice coil 130 cause actuator assembly 120 to rotate about pivot 121, thereby bringing the read/write devices into various radio locations relative to disc surfaces 116. It can be seen that, with spindle motor 106 rotating discs 110 for example, in a direction indicated by arrow 140, and actuator assembly 120 moving read/write heads 128 in an arcuate path, as indicated by arrow 142, across disc surfaces 116, various locations on disc surfaces 116 can be accessed by the read/write heads for data recordation or retrieval.

As discs 110 are rotated, fluid or air adjacent to disc surfaces 110 is also brought into motion, generating air streams or flow currents in the disc drive enclosure. This airflow, or windage, create forces both in direction 140 in the plane of disc surfaces 116, as well as a direction normal to the plane of disc 116. There also may be various other windage-induced forces occurring throughout the cavity provided by base 102 and cover 104.

Figure 2:
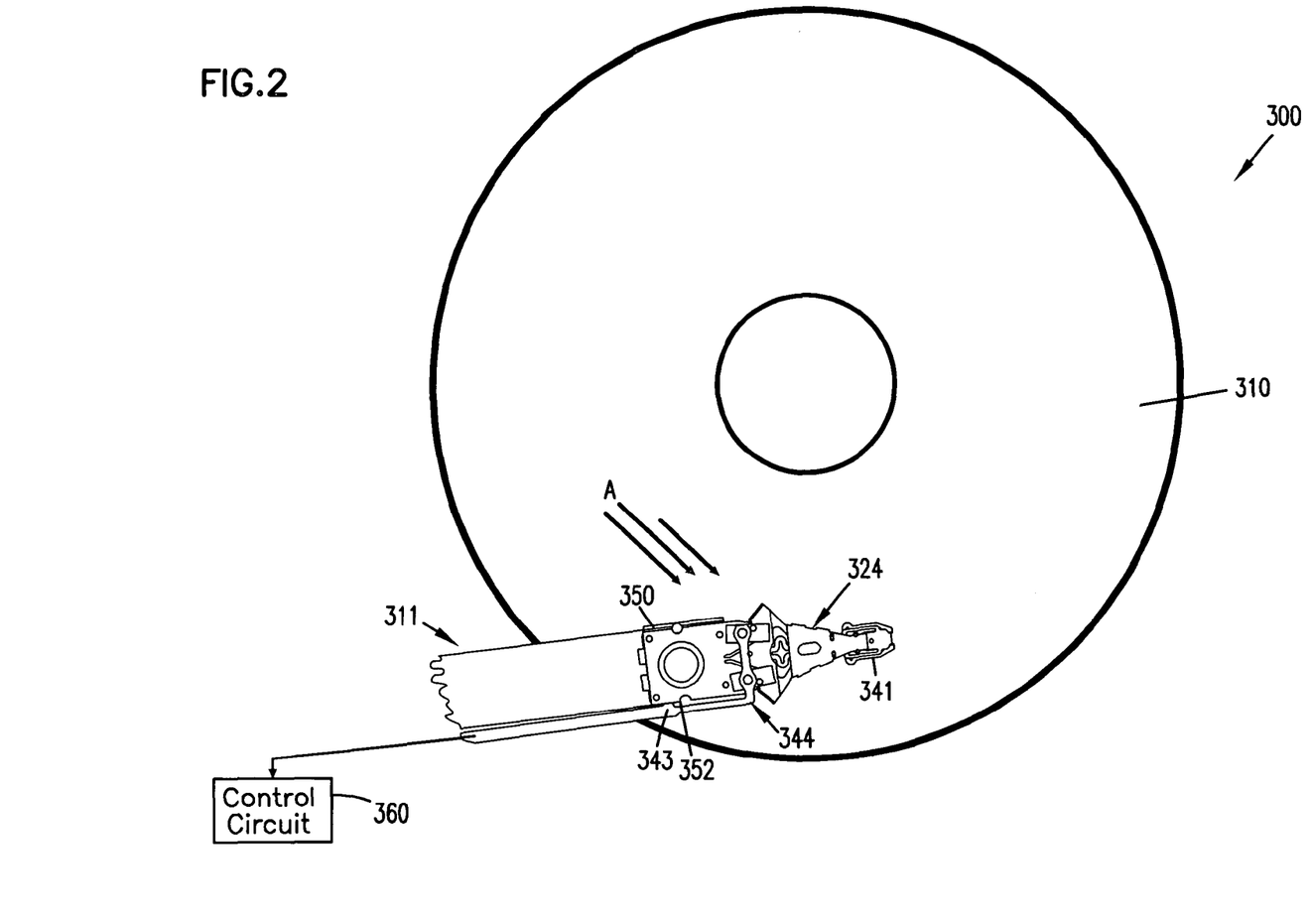
FIG. 2 is a plan view of a disc drive system incorporating an example embodiment of a suspension assembly mated to an interconnect assembly according to the present invention.

FIG. 2 shows a disc drive system 300 incorporating an example embodiment of a suspension assembly 324 mated to an interconnect assembly 344 of the present invention. Disc drive system 300 generally includes a disc 310, an arm arrangement (shown generally as 311), control circuitry 360 and interconnect assembly 344. As is conventionally known, disc 310 contains magnetically encoded information and is rotated by a spindle motor. Arm arrangement 311 is supported above disc 310 by an actuator assembly that generally includes an actuator arm (not shown), a support arm (not shown), and a suspension assembly 324 supporting a head 322 (see FIG. 3). The actuator arm extends from an actuator and attaches to the support arm. The support arm extends from the actuator arm and is attached to suspension assembly 324.

Figure 3:
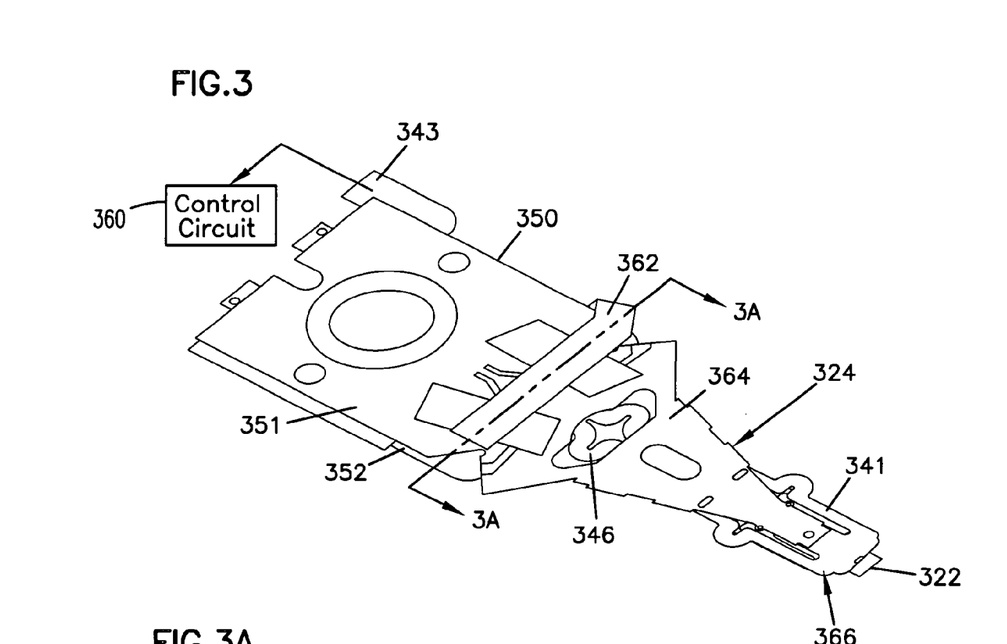
FIG. 3 is a plan view of the suspension assembly shown in FIG. 2.
Figure 3A:
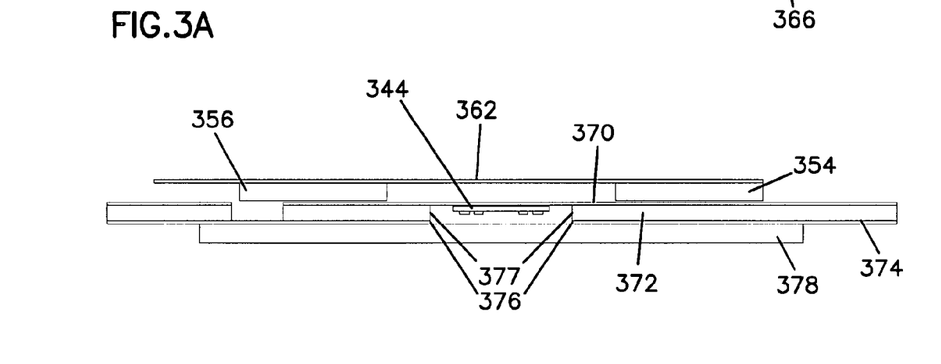
FIG. 3A is a section view along line 3A—3A of FIG. 3.
Figure 3B:
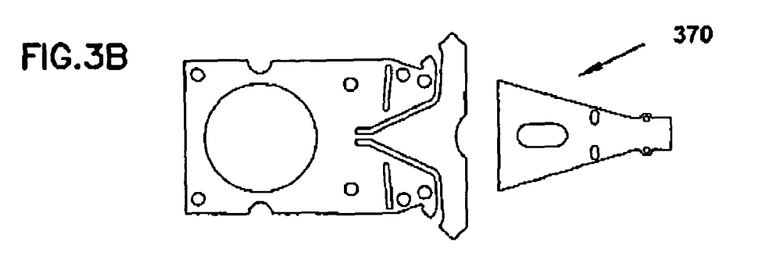
FIG. 3B is a plan view of the top layer of the suspension assembly of FIG. 3.
Figure 3C:
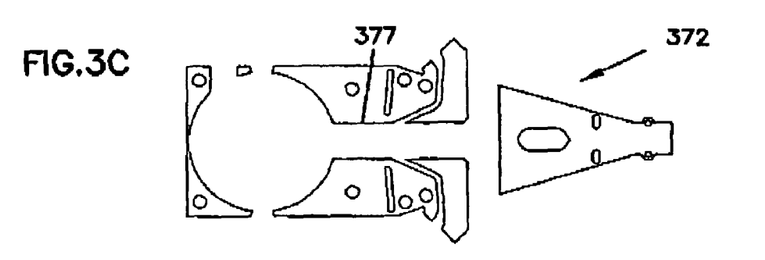
FIG. 3C is a plan view of the core layer of the suspension assembly of FIG. 3.

Referring to FIGS. 2 and 3, the disc drive system 300 includes a suspension assembly 324 having a load beam 364 and a gimbal portion 366. Suspension assembly 324 supports head 322, which is located on the gimbal portion 366 of the suspension assembly 324, preferably by an adhesive such as glue or fluid epoxy. Alternatively, head 322 may be mounted to suspension assembly 324 by other conventional mounting methods well known in the art. Suspension assembly 324 cooperates with an arm (not shown), which is connected to the actuator arm (not shown), to resiliently support head 322 to allow head 322 to read and write data to the disc 310.

As the disc drive system 300 operates, disc 310 rotates and induces airflow that includes a radial component (applied in a direction A shown in FIG. 2) and a tangential component (in a direction perpendicular to a primary surface of disc 310). As a result of the combined components, strong currents are created, and the resulting airflow causes windage-induced vibration of the suspension assembly 324. The effects of the windage-induced vibration cause the head 322 to vibrate, thus affecting the vertical spacing between the head 322 and the disc 310 as well as the on-track stability of head 322. The airflow impinges upon a windward, or leading edge 350 of the suspension assembly 324 and creates a turbulent wake on the leeward, or trailing, edge 352 of the suspension assembly 324. An advantage of the present invention is that it reduces windage-induced vibration that affects the vertical spacing between the head 322 and the disc 310, as will be discussed.

Disc drive system 300 also includes interconnect assembly 344 to complete the electrical connection between the head 322 and the control circuitry 360. Preferably, the interconnect assembly 344 is a flex-on suspension, or flex circuit made from a polysinide substrate, with manufacturing techniques for flex circuits being well known in the art. Interconnect assembly 344 includes a head portion 341, a tail portion 343, and electrical conductors 346 (see FIG. 3) that extend from the head 322 to the control circuitry 360 and electrically transmits electrical signals between the head 322 and the control circuitry 360. Preferably, the tail portion 343 extends along the leeward edge 352 of the suspension assembly 324. FIGS. 3 and 5A–F show the tail portion 343 extending along an opposing side of the interconnect assembly 344 as compared to the arrangement shown in FIG. 2. However, this merely illustrates that the interconnect tail can be positioned on either side of the interconnect assembly depending on the orientation of the suspension assembly relative to the center of the disc, so long as the interconnect tail is on the leeward side.

Referring to the example embodiment shown in FIGS. 5A–F, the interconnect assembly 344 is mated to the suspension assembly 324. The interconnect assembly 344 and suspension assembly 324 can be mated using a variety of techniques well know to one of skill in the art, for example, using glue or epoxy.

Example Embodiment of Suspension and Interconnect

Figure 3D:
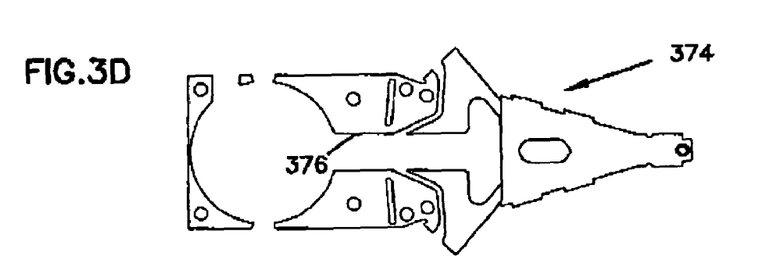
FIG. 3D is a plan view of the bottom layer of the suspension assembly of FIG. 3.
Figure 3E:
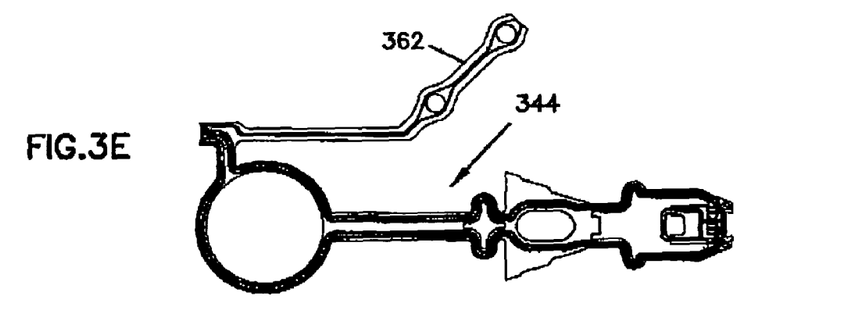
FIG. 3E is a plan view of the interconnect circuit of the suspension assembly of FIG. 3.

To reduce windage-induced vibration, the present invention reduces the area of the interconnect assembly exposed to the air currents generated by disc rotation. Referring to FIGS. 3A–F, an example embodiment of a suspension assembly mated to an interconnect assembly of the present invention is shown. The suspension assembly includes a top 370 (FIG. 3B), a core 372 (FIG. 3C), and a bottom layer 374 (FIG. 3D). Preferably, the suspension assembly 324 is formed from a laminate material, such as a laminate material made from, for example, layers of steel/poly/steel, which allows features to be created on the suspension assembly 324, for example, by etching. Preferably, the top and bottom steel layers have a thickness in the range of about 20 to 70 µm, and the core layer has a thickness in the range of about 10 to 125 µm. In order to have sufficient room for the interconnect assembly 344, the core layer, or at least the trench provided by core 372 and bottom layer 374 for the interconnect assembly, should have a thickness of at least about 50 µm.

The laminate material layers may be made a variety of different materials. For example, the top and bottom layers may include a metal or metal alloy, and the core layer may include a polymer material such as Kapton® film or other polyimide materials. The core layer may also include an adhesive type material or a material optimized to have high damping properties, such as visco-elastic adhesive.

The bottom layer 374 forms the base of the suspension assembly 324 and includes a trench 376 for interconnect assembly 344. The core layer 372 is coupled, directly or indirectly, between the top layer 370 and the bottom layer 374, and also includes a trench 377 arrangement (that preferably match trench 376) that receives and houses a portion of the interconnect assembly 344 (see FIG. 3E). The top layer 370 preferably does not include a trench feature to promote capturing of the interconnect assembly 344 in the suspension assembly 324.

Figure 3F:
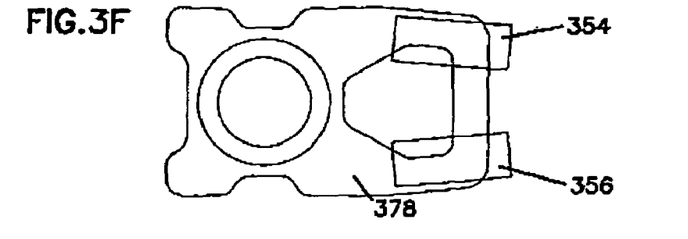
FIG. 3F is a plan view of the base plate and PZTs of the suspension assembly of FIG. 3.
Figure 4:
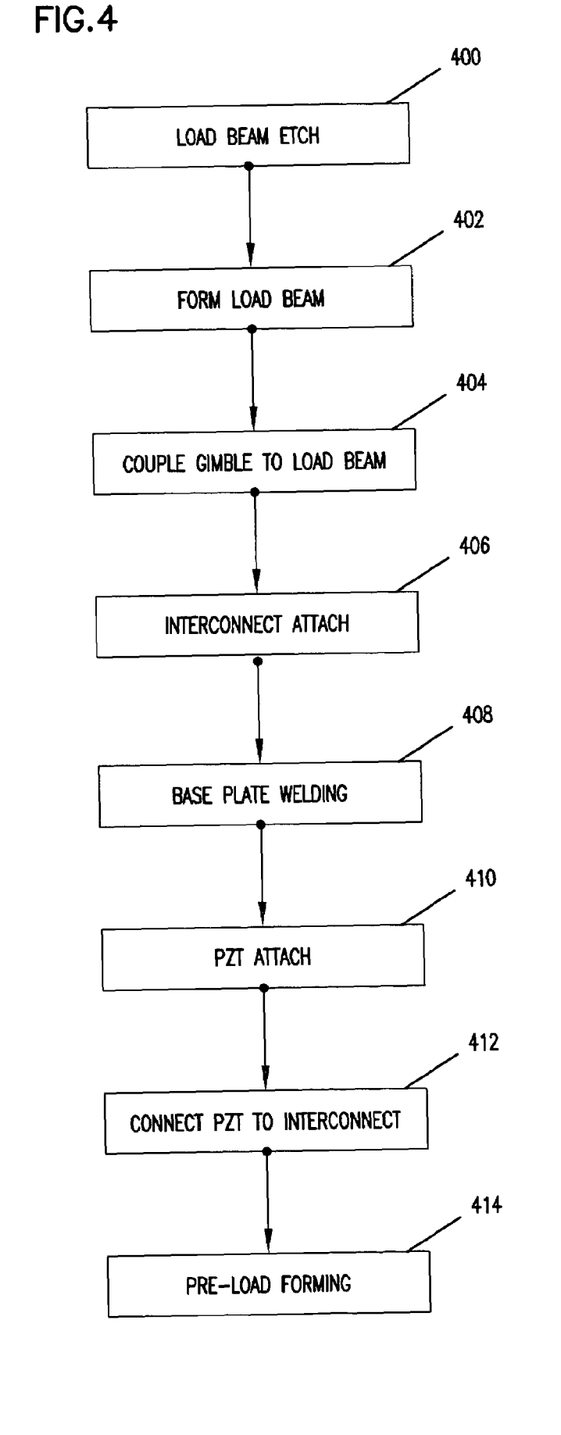
FIG. 4 is a process flow diagram of an example embodiment of a method of making an interconnect assembly of the present invention according to the present disclosure.
Figure 5A:
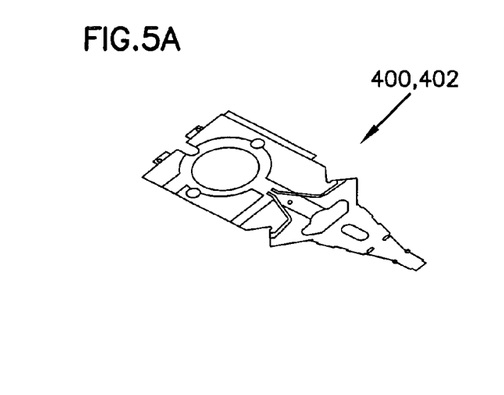
FIGS. 5A–5F are perspective views of the components being assembled according to the process flow diagram of FIG. 4.
Figure 5B:
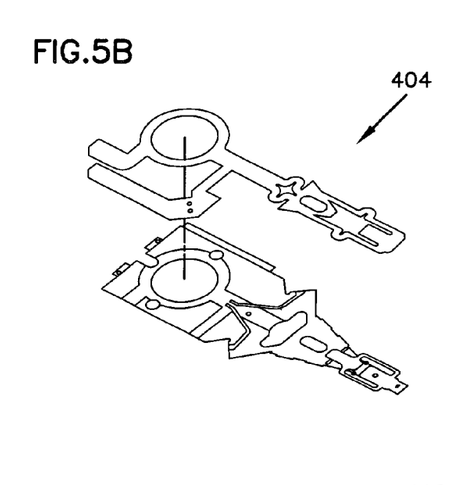
Figure 5C:
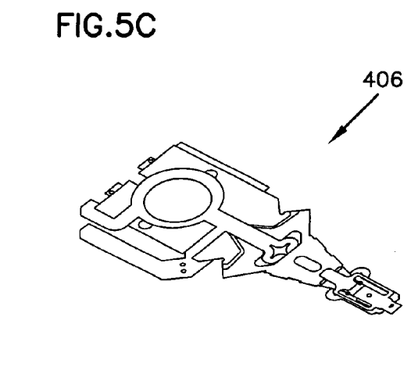
Figure 5D:
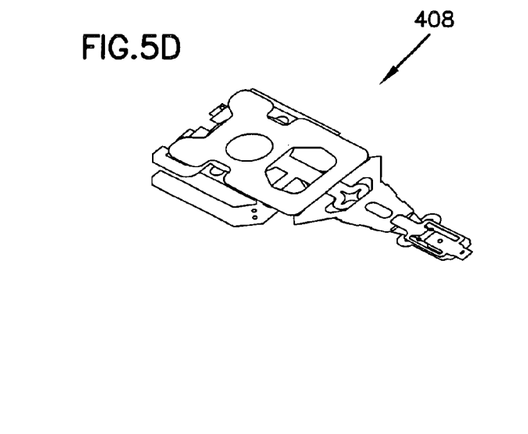
Figure 5E:
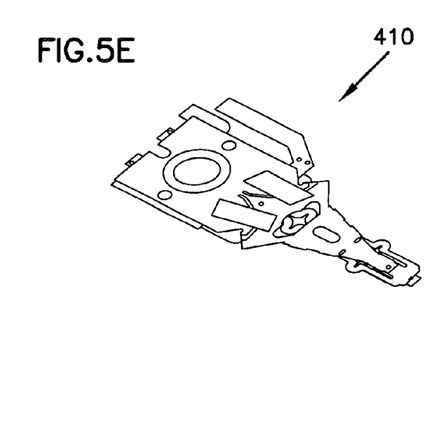
Figure 5F:
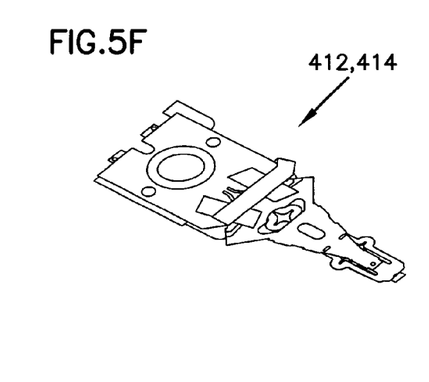

A pair of PZTs 354, 356 are typically mounted to a primary exposed surface 351 of top layer 370 (see FIG. 3) and oriented relative to certain features of a base plate 378 as shown in FIG. 3F. A second section 362 of the interconnect assembly 344 is connected to first and second PZTs 354, 356. The base plate 378 is typically positioned adjacent a surface of the disc 310, although different stacking orientations are possible, and is used to mount the suspension 324 to the rest of arm assembly 311.

Method Of Assembly

Referring to FIGS. 4 and 5A–F, one example method of fanning a suspension assembly having an interconnect assembly with a reduced exposed area is illustrated. A sheet of stock material, for example, a sheet of laminate material or layers of a sheet of laminate material, may be etched (400) to form a load beam (402). A trenching arrangement in the load beam may be preformed using techniques known to one of skill in the art. A gimbal assembly may be coupled to the load beam (404) using techniques known to one of skill in the art, such as welding or gluing. The interconnect assembly is then located in the trenching arrangement and secured into place (406). The interconnect assembly is also electrically connected to the heads on the gimbal assembly. The interconnect is located between the base plate and the top layer of the load beam and a base plate is coupled to the load beam (408). The PZTs may then be attached to the suspension assembly (410). The outer portion of the interconnect assembly may then be folded over and welded to the PZTs (412). A pro-load force may then be applied in the finished assembly (414) by adding a bend at a bend section of the load beam.

An advantage of the present invention is that it may greatly reduce vibration of the suspension assembly as measured at the head (a critical parameter for accurate data transfer between the disc and the head), thus reducing the introduction of errors due to windage-induced vibration. Another possible advantage of the present invention is that after the interconnect assembly is enclosed between the base plate and the suspension assembly, the enclosed portion of the interconnect is not exposed to further assembly tooling.

A yet further advantage of the present invention relates to the symmetry of the suspension assembly enabled by routing the interconnect in a trench of the laminate. Symmetry in the suspension assembly is typically one of the design objectives when creating a suspension assembly. Asymmetry in the suspension assembly invariably leads to resonance issues would not normally cause vibration problems in the suspension. For example, the bending modes of the suspension primarily move the suspension up and down without any side-to-side motion that would lead to off track motion of the head. However, when there is asymmetry present in the suspension assembly, the otherwise normal up and down motion of the bending modes may begin to take on some side-to-side motion. Known suspension assembly designs that rout the interconnect along a side of the load beam are inherently asymmetrical, thus making them subject to possible resonance issues, as discussed above. The present invention increases the amount of symmetry in the suspension assembly by routing the interconnect assembly in a trench down the center of the suspension assembly.

It will be clear that the present invention is well adapted to attain the ends and advantages mentioned as well as those inherent therein. While presently preferred embodiments have been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A suspension assembly adaptable to support a sensor member, the suspension assembly comprising:
    a base plate;
    a load beam mounted to the base plate and having a length, the load beam comprising a laminate material, the laminate material having a first layer, a second layer, and a core layer positioned between the first and second layers, wherein at least a portion of said first layer and said core layer has a void formed therein; and
    an interconnect circuit mounted within the void.

2. The assembly of claim 1 wherein the load beam is secured to the base plate at the bottom layer of the laminate material.

3. The assembly of claim 1 wherein the interconnect circuit includes a first portion and a second portion, and the load beam further comprises an exposed primary surface and a leeward edge, the first portion being mounted in the void, and the second portion extending along the leeward edge of the load beam.

4. The assembly of claim 1 wherein the first layer comprises steel, the core layer comprises a polymer material, and the second layer comprises steel.

5. The assembly of claim 1 wherein the load beam includes a first end supporting the a sensor member, a second end adjacent the base plate, and a bend section between the first and second ends, and the void extends from the second end to the bend section.

6. The assembly of claim 1 wherein the interconnect circuit is a flex-on-suspension circuit.

7. The assembly of claim 1 wherein the load beam further comprises a boss aperture configured to mount the suspension assembly to a support arm having a boss.

8. A suspension assembly configured to reduce windage-induced vibration in a head supported by the suspension assembly, comprising:
   a base plate;
   a load beam mounted to the base plate and having a length, the load beam comprising a laminate material, the laminate material having a bottom layer, a top layer, and a core layer positioned between the top and bottom layers, the load beam further comprising a trench formed in the laminate material and extending along at least a portion of the length of the load beam, wherein the trench is formed in the bottom and core layers of the laminate material; and
   an interconnect circuit mounted to the load beam in at least a portion of the trench.

9. The assembly of claim 8 wherein the load beam is secured to the base plate at the bottom layer of the laminate material.

10. The assembly of claim 8 wherein the interconnect circuit includes a first portion and a second portion, and the load beam further comprises an exposed primary surface and a leeward edge, the first portion being mounted in the trench, and the second portion extending along the leeward edge of the load beam.

11. The assembly of claim 8 wherein the top layer comprises steel, the core layer comprises a polymer material, and the bottom layer comprises steel.

12. The assembly of claim 8 wherein the load beam includes a first end supporting the bead, a second end adjacent the base plate, and a bend section between the first and second ends, and the trench extends from the second end to the bend section.

13. The assembly of claim 8 wherein the interconnect circuit is a flex-on-suspension circuit.

14. The assembly of claim 8 wherein the load beam further comprises a boss aperture configured to mount the suspension assembly to a support arm having a boss, and the trench extends around the boss aperture.

15. An apparatus for reducing windage-induced vibration the apparatus comprising:
   a laminate load beam including a bottom steel layer, a core polyimide layer, and a top steel layer, wherein a trench arrangement is formed in the bottom and core layers; and
   a circuit housed within the trench arrangement.

16. The apparatus of claim 15 further including a plate coupled to the load beam, wherein the circuit is between the load beam and the plate.

17. The apparatus of claim 15, wherein the bottom steel layer has a thickness in the range of about 20 to 75 µm, the core polyimide layer has a thickness in the range of about 10 to 125 µm, and the top steel layer has a thickness in the range of about 20 to 75 µm.

18. The apparatus of claim 15, wherein the bottom steel layer has a thickness of about 30 µm, the core polyimide layer has a thickness of about 75 µm, and the top steel layer has a thickness of about 30 µm.

19. A disc drive comprising:
   a rotating disc having an inner and outer diameter;
   a suspension assembly for supporting a head over the disc, the suspension having;
   a laminate load beam including a bottom steel layer, a core polyimide layer, and a top steel layer, wherein a trench arrangement is formed in the bottom and core layers; and
   a circuit housed within the trench arrangement.

20. The disc drive of claim 19 including a plate coupled to the load beam, wherein the circuit is between the load beam and the plate.

21. The disc drive of claim 19 wherein the bottom steel layer has a thickness in the range of about 20 to 75 µm, the core polyimide layer has a thickness in the range of about 10 to 125 µm, and the top steel layer has a thickness in the range of about 20 to 75 µm.

22. The disc drive of claim 20 wherein the load beam comprises a gimbal portion, a bend section, and a base portion, the gimbal portion supporting the head and the bend section being positioned between the base portion and the gimbal portion, and the trench arrangement includes a trench that extends from the bend section and through at least a part of the base section.

* * * * *